United States Patent [19]

Sizer, II

[11] Patent Number: 5,566,232
[45] Date of Patent: Oct. 15, 1996

[54] SYSTEM AND APPARATUS FOR RECORDING AND ACCESSING INFORMATION RECEIVED OVER A PHONE NETWORK USING A PREMISES PHONE FOR CONTROL

[75] Inventor: Theodore Sizer, II, Little Silver, N.J.

[73] Assignee: Lucent Technologies Inc., Murray Hill, N.J.

[21] Appl. No.: 330,173

[22] Filed: Oct. 27, 1994

[51] Int. Cl.$^6$ ............... H04M 11/00; H04M 15/00; H04M 15/06; H04H 1/00
[52] U.S. Cl. ............... 379/142; 379/127; 379/102; 379/105; 348/10; 348/14; 455/4.1; 455/4.2
[58] Field of Search ............... 379/102, 105, 379/127, 142; 348/10, 14; 455/4.1, 4.2

[56] References Cited

U.S. PATENT DOCUMENTS

| | | | |
|---|---|---|---|
| 4,882,747 | 11/1989 | Williams | 379/102 |
| 5,054,055 | 10/1991 | Hanle | 379/142 |
| 5,127,045 | 6/1992 | Cragun | 379/105 |
| 5,191,410 | 3/1993 | McCalley | 379/105 |
| 5,278,889 | 1/1994 | Papanicolaou | 348/14 |
| 5,349,638 | 9/1994 | Pitroda | 379/142 |
| 5,404,393 | 4/1995 | Remillard | 379/105 |

Primary Examiner—Wellington Chin
Assistant Examiner—Vijay Shankar

[57] ABSTRACT

An apparatus records and accesses information received over a phone network. The apparatus is part of a system that has a premises phone connected to the phone network via a first communication channel. The apparatus includes a premises recording unit which records information, phone messages and prompts received from the network along the first communication channel. The premises recording unit interfaces with the video display for displaying stored information, telephone messages and prompts. The premises recording unit is responsive to control signals received from a premises phone along a second communication control channel extending between the premises phone and premises recording unit. A switch in the system allows the premises phone to communicate with the network along the first communication channel and also controls the premises recording unit through signal generation by the premises phone through the second communication control channel to the premises recording unit. The first communication channel can comprise a twisted pair of wire and a carrier signal extending along the twisted wire pair at a first frequency range. The second communication channel can comprise a subcarrier signal extending along the twisted wire pair at a second frequency range.

42 Claims, 4 Drawing Sheets

SYSTEM AND APPARATUS FOR RECORDING AND ACCESSING INFORMATION RECEIVED OVER A PHONE NETWORK USING A PREMISES PHONE FOR CONTROL

This application is related to U.S. patent application Ser. No. 08/292,476, filed Aug. 18, 1994, entitled APPARATUS FOR PROVIDING A GRAPHICAL CONTROL INTERFACE, and copending patent application Ser. No. 08/330,153 entitled "APPARATUS AND SYSTEM FOR RECORDING AND ACCESSING INFORMATION RECEIVED OVER A TELEPHONE NETWORK", filed on Oct. 27, 1994 hereof by the same inventor.

1. FIELD OF THE INVENTION

This application relates to a system and apparatus for recording and accessing information received over a phone network wherein a premises phone controls a premises recording unit via a second communication channel and switch.

2. BACKGROUND OF THE INVENTION

Most ordinary answering machines are limited in function. They record a message and play it back at a later date. The advent of more sophisticated telephone network services in buildings and in the general population, as well as more sophisticated cable and telephone systems, allows greater potential for recording information, telephone messages and prompts transmitted into a recording unit from a communication channel operatively connected to a telephone network or cable system.

Sophisticated information is now available, such as caller identification, time of call, video data, billing and credit information interactive multimedia and other data. With the large increase of information becoming difficult to manage, it is desirable sometimes to separate the information or classify the main parts until it can be analyzed later, such as on playback from a recording unit. It would also be desirable if some information such as the identification of the caller, the time of the call, and other pertinent information could be displayed on a video display such as a television set. This may be important to users who desire their premises to be a safe haven from numerous phone calls, while allowing those calls which have been recorded to be handled at a later time.

Such a unit would also have to be expandable to allow adaptability to different services which could be offered on a network. New services are increasingly important, and any unit should be adaptable for a wide range of services. Additionally, the unit should be usable by a homeowner within the premises without much difficulty.

It is also desirable if a premises phone could be operatively connected to the premises recording unit so that the premises phone also controls various functions of the unit. This would mandate requirement of second communication channel and a switch so that the premises phone can be operatively connected to the network via a first communication channel for communication as well as switched into a second communication channel for allowing control over a recording unit.

SUMMARY OF THE INVENTION

The present invention now provides a system for recording and accessing information received over a phone network while allowing control of the premises recording unit through a second communication control channel which extends between a premises phone and the premises recording unit. In accordance with the present invention, at least one premises phone is connected to a phone network via a first communication channel. A premises recording unit records information, phone messages and prompts received from the network along the first communication channel. The premises recording unit includes an interface connector for interfacing with the video display such as a television set for displaying stored information, telephone messages and prompts.

The premises recording unit is responsive to signals received from a premises phone along a second communication control channel extending between the premises phone and the premises recording unit. A switch is operatively connected between the premises phone, phone network and premises recording unit for switching the premises phone from 1) communication with the network along the first communication channel; and 2) control of the premises recording unit through control signal generation by the premises phone to the second communication control channel to the premises recording unit.

In one aspect of the invention, the first communication channel comprises a twisted pair of wire and a carrier signal extending along the twisted pair of wire having a first frequency range. The second communication channel comprises a subcarrier signal extending along the twisted pair of wire having a second frequency range.

In still another aspect of the present invention, the switch can be responsive to a predetermined dual tone multifrequency tone (DTMF) sequence received from the premises phone to switch the premises phone to communication with the premises recording unit via a second communication channel. In still another aspect of the present invention, the premises recording unit is responsive to DTMF tones generated from a network phone to retrieve and prompt audio messages from the premises recording unit to a network caller.

The system can include a ring detection mechanism operatively connected to the premises recording unit and switch. The mechanism is responsive a predetermined number of rings to allow the premises recording unit to answer. The premises recording unit can be responsive to DTMF tones generated by the network phone to enable message retrieval and audio prompting with the premises recording unit. The premises phone can comprise a cordless phone unit and the premises recording unit can also include voice recognition circuitry for responding to voice commands in another aspect of the invention.

The premises recording unit includes a microprocessor, and a memory unit such as RAM for storing digital information. The microprocessor and memory are connected by a digital bus. An analog-to-digital converter is connected along the digital bus and receives analog signals from the network or other source and converts those signals to digital format for storage in RAM or other storage means and subsequent processing by the microprocessor.

The premises recording unit can also include an infrared sensor for enabling control of the premises recording unit via an infrared signal generated by a premises control unit, such as a hand held remote. The control unit can include a keypad. Infrared signals are generated corresponding to depressed keys of the keypad. The premises recording unit can also include means for receiving the infrared signals for further processing and display of any characters on the video display. The system can include a plurality of premises phones and respective switches corresponding to respective premises phone. A memory can store caller identification information related to an incoming telephone call having a caller identification code.

In still another aspect of the present invention, a local bus includes an expansion bus and a cartridge slot receives cartridges for interconnecting with the expansion bus for expanding functions of the premise recording unit. The cartridges can include a modem, game cartridges and other cartridges.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
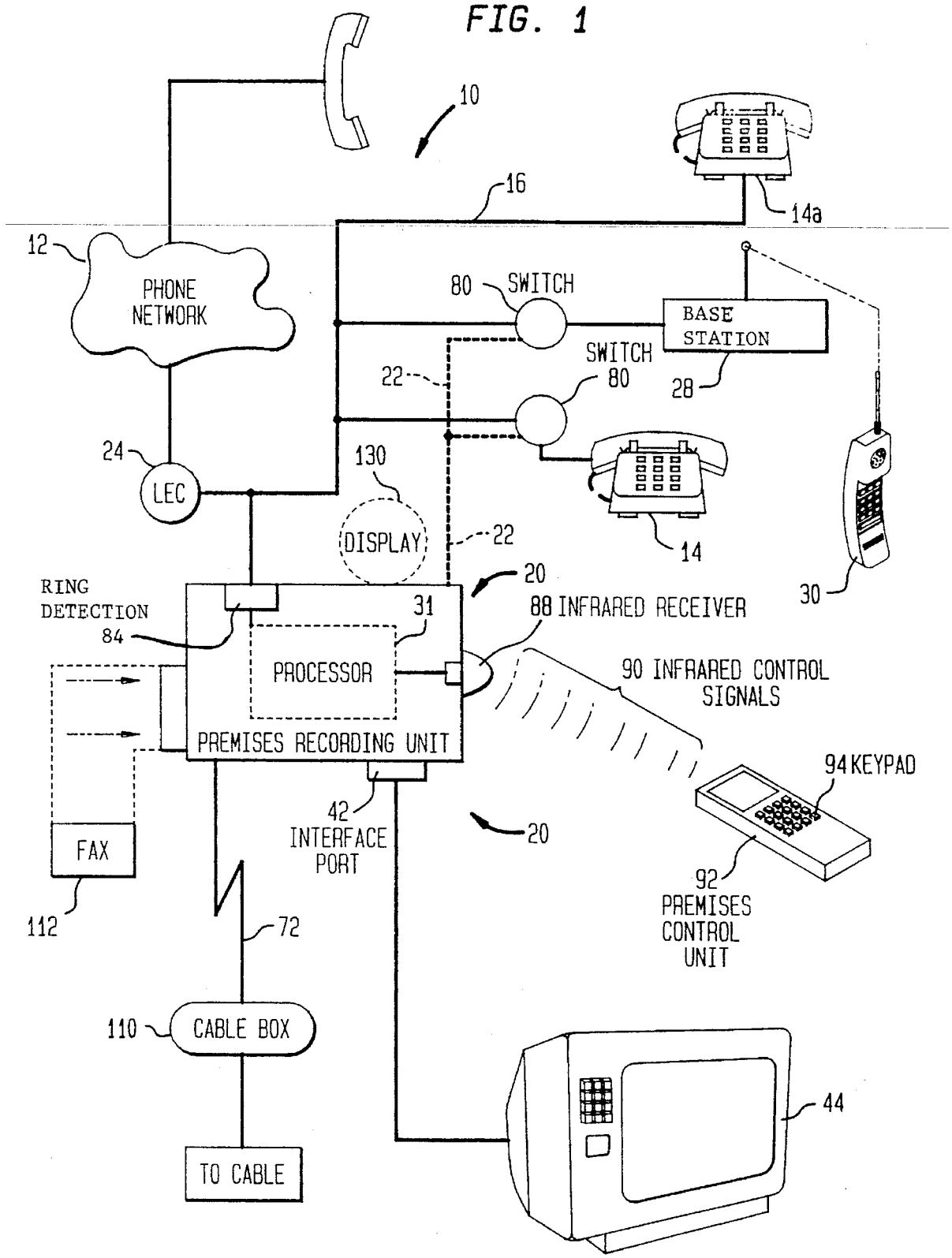
FIG. 1 is a schematic environmental view of the apparatus and system of the present invention that records and accesses information.

Referring now to FIG. 1, there is illustrated generally at 10 a system of the present invention for recording and accessing information received over a phone network 12 where at least one premises phone 14 is connected to the phone network 12 via a first communication channel 16. A premises phone 14 also controls a premises recording unit, indicated at 20, by transmitting control signals through a second communication control channel 22 (also known as incoming control line) extending between the premises phone 14 and the premises recording unit 20. As shown in FIG. 1, at least two premise phones are shown in the home environment known as the premises and are connected to the local office 24 of the network 12 via the first communication channel 16. As illustrated, a wireless base station 28 is connected to the first communication channel 16 and works with a hand-held cordless telephone 30. One of the premises phones 14a, does not connect to the second communication channel 22, so that it bypasses the premises recording unit 20.

The illustrated embodiment shows the premises phones 14, 14a operatively connected to an outside phone network 12 having a local office 24. The phone network 12 can also be a local phone network or other local area network in a building or other environment.

Figure 2:
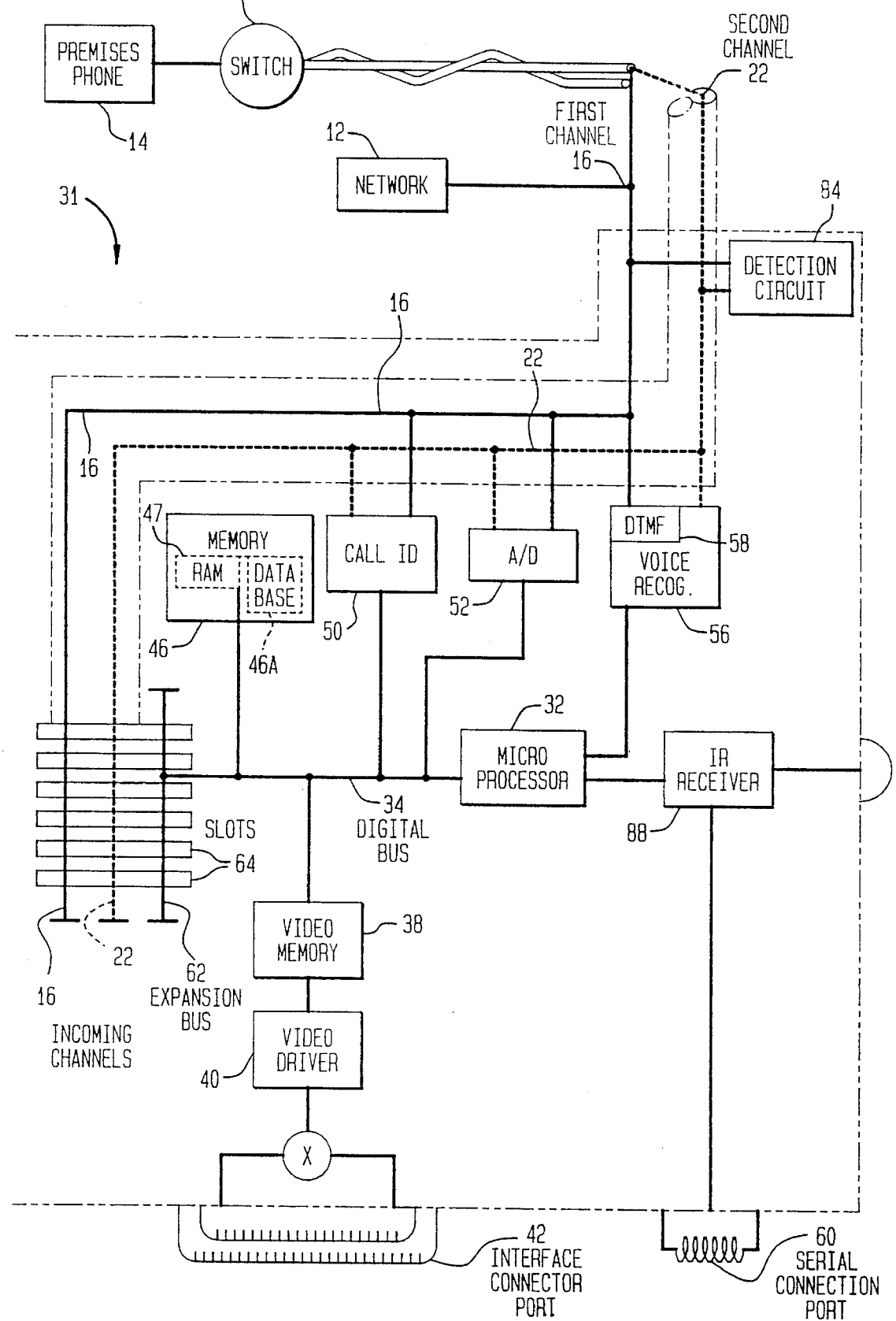
FIG. 2 is a high level block diagram of the premises recording unit of the present invention.

Referring now in greater detail to FIG. 2, the premises recording unit 20 records information, phone messages, and prompts received from the network along the first communication channel 16. The premises recording unit 20 has a main processing system, indicated generally at 31, which includes a microprocessor 32 connected to a digital bus 34. The unit 20 also includes a video memory circuit 38 and a video driver circuit 40 which are connected along the digital bus 34 to the microprocessor via the bus 34 at one end and to a standard video interface connector port 42 at the other end.

The premises recording unit 20 connects via the video interface connector port 42 with a video display such as a television set 44 (FIG. 1) to display stored information, telephone messages and prompts received from control signals such as from a premises phone or a network phone. The premises recording unit also includes a memory 46 for storing digital information. The memory can be RAM 47 or other known memory devices. The memory 46 is connected to the digital bus 34. Data is withdrawn from memory 46 when instructed by the microprocessor 32. A database of caller identifications can be maintained in a memory database 46a. The information in this database 46a can include other information such as addresses or business information of potential callers which is displayed when the caller is identified.

Caller ID circuitry 50 is connected to the bus 34 and identifies any caller ID information in a telephone call such as is conventionally known. An analog-to-digital converter 52 converts incoming analog signals to digital data for storage in memory 46 and further processing by the microprocessor 32. This line also is connected to the digital bus 34 and incoming channels 16, 22. The premises recording unit also includes voice recognition circuitry 56 for responding to voice commands. This circuitry connects to the microprocessor 32 and both communication channels 16, 22. The circuitry 56 also includes Dual Tone Multifrequency tone detection circuitry 58 connected to the communication channels 16, 22 extending to the network and premises phone. This circuitry 58 detects tones used as control signals generated from either a premises phone or a network phone. Those control signals instruct the processor to control processing and memory by recording or retrieving messages or displaying messages on the television through the video circuits 38, 40. A serial connection port 60 connects to the microprocessor 32 and allows connection to modems and other serial devices.

In accordance with the present invention, the digital bus includes an expansion bus 62. A plurality of slots 64 are positioned in the housing for receiving various cartridges for insertion within the slots for connection to the expansion bus 62. The expansion bus allows expansion of various functions of the premises recording unit 20. This is advantageous especially since advances are quickly made in the telephone services industry, which offer new services continually. Thus, updating is often required.

In accordance with the present invention, the premises recording unit 20 is responsive to signals received from a premises phone 14 along the second communication control channel (also control line 22) extending between the premises phone 14 and the premises recording unit 20. In accordance with the present invention, the first communication channel can comprise a twisted pair of wire 70 and a carrier signal having a first frequency range. The second communication control channel 22 can comprise a subcarrier channel along the twisted pair of wire 70 and having a second frequency range, such as about 100 KHz. Additionally, an additional twisted pair which exists in some homes can be used for the second communication control channel 22 if a second twisted wire pair is connected throughout the home or business premises.

As shown in FIG. 1, a switch 80 is operatively connected between the premises phone 14, the phone network 12, and the premises recording unit 20 for switching the premises phone 14 from communication with the network 12 along by the first communication channel 16 and control of the premises recording unit 20 through control signal generation by the premises phone 14 through the second communication control channel 22 to the premises recording unit 20. Each phone 14, 30 has a respective switch 80. The switches 80 can be responsive to a predetermined Dual Tone Multi-frequency Tone (DTMF) sequence received from the premises phone 14 to switch the premises phone to communication with the premises recording unit via the second communication control channel 22. The switch 80 can also be controlled by picking the premises phone off the hook.

The premises recording unit also can be responsive to DTMF tones generated from a network phone to retrieve and prompt audio messages from the premises recording unit. This is advantageous when the user is geographically spaced from the premises and desires to obtain audio messages and prompts. A ring detection circuit 84 (FIG. 1) can be operatively connected to the premises recording unit 20 and the switch 80. The circuit 84 can be responsive to a predetermined number of rings and allows the premises recording unit to answer the call if the call is not answered by the a user of the premises phone.

Typically, the video display such as the television 44 would display the identification of the caller, the caller's name, the time of the call, and the telephone number. Additionally, if any messages were left, the messages could be heard through the TV speaker or a separate speaker attached to the premises recording unit 20.

Figure 3:
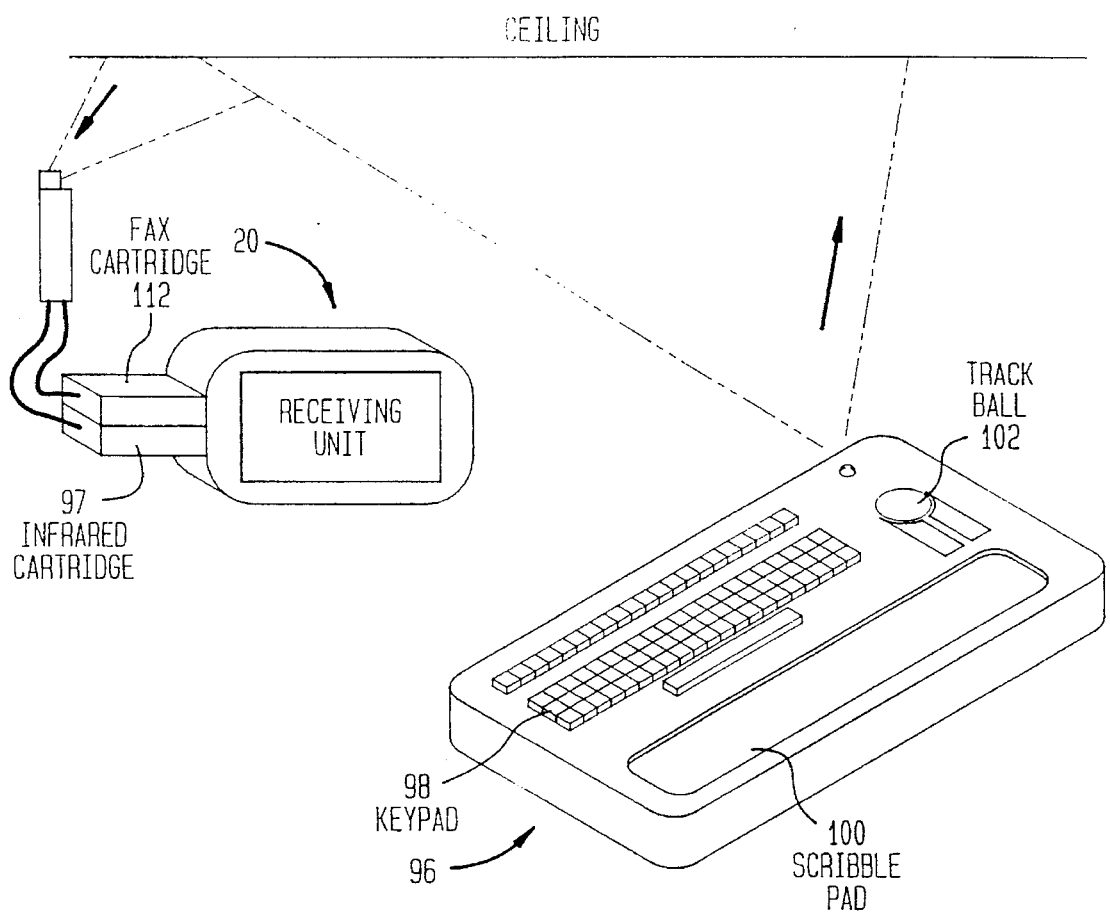
FIG. 3 is a schematic diagram showing use of a combination keyboard, track ball and scribble pad which can be used with the present invention.
Figure 4:
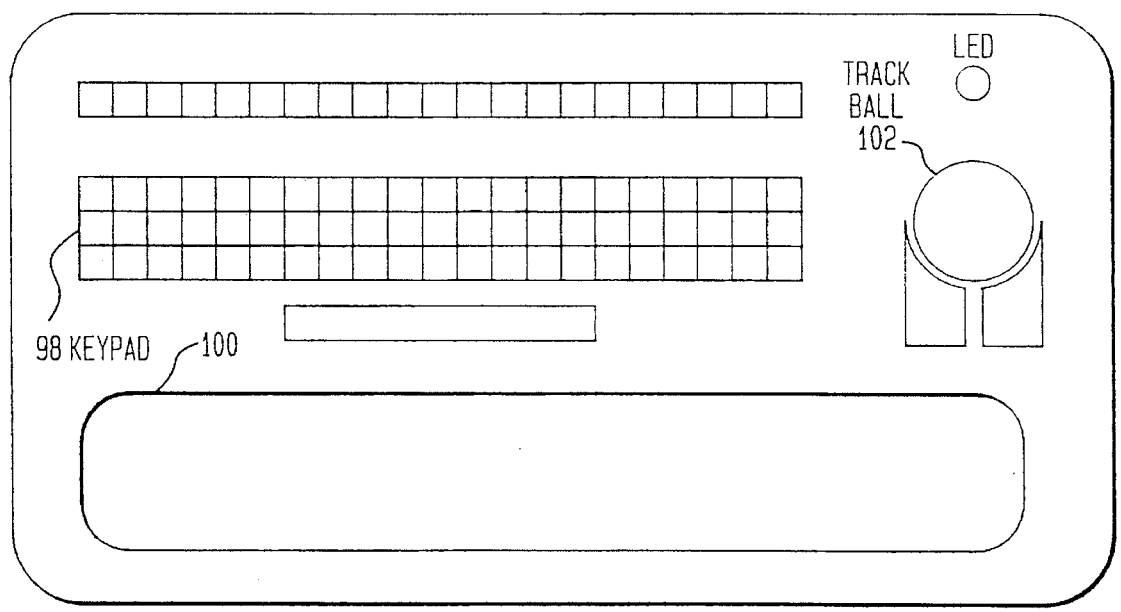
FIG. 4 is a schematic plan view of the combination infrared keyboard, scribble pad and track ball.
Figure 5:
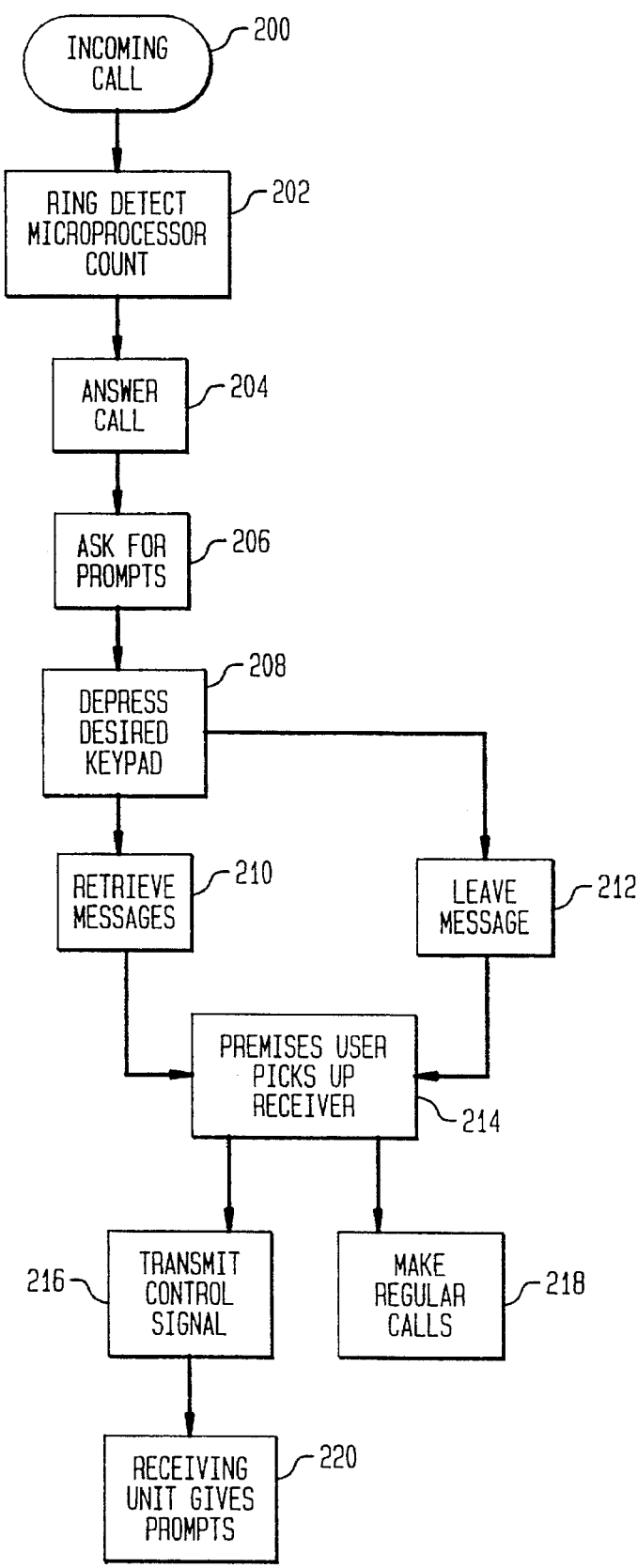
FIG. 5 is a high level flow chart depicting one sequence of possible steps for storing information in and accessing information from the premises recording unit.

As illustrated in FIG. 2, the premises recording unit 20 can include an infrared receiver 88 to obtain and receive infrared control signals 90 generated from a premises control unit 92 as shown in FIG. 1. The premises control unit 92 can be a hand held remote control device with a keypad 94. The infrared premises control unit 92 can be preprogrammed so that a select sequence of depressed buttons on the keypad causes selected functions of the unit 20 to be displayed on the television 42. Additionally, as shown in FIG. 3, a separate combination keyboard/scribble pad/track ball indicated generally at 96 and which generates infrared signals, can control the premises recording unit 20. Additional control can be obtained through a selected cartridge 97 inserted within the slot and attached to the expansion bus as shown in FIG. 3. The combination keyboard can include the standard keyboard 98, a scribble pad 100 and a track ball 102 as shown in FIG. 4. Commands can be echoed on the video display such as television 44. Faxes can be created as well as E-mail messages when an appropriate cartridge is used. Other cartridges can be used such as game cartridges. Also complicated game software can be delivered over various information channels such as the network.

As shown in FIG. 1, a cable loop-through can be provided by the cable Set Top Box 110 which can be connected to the premises recording unit. Looping through the cable and downloading a game can provide greater speed. A separate fax cartridge 112 can also be inserted within the slot. Any modem can include decompression and compression and hardware and software.

Also, the unit 20 can be controlled by a selected DTMF sequence from a network phone, such as an outside caller. The unit 20 can be programmed to give prerecorded answers. An additional memory system (not shown) could provide prerecorded responses, such as prompts, for instructing the caller of how to respond to retrieve messages in or out of the home. The unit can also include an onboard display 130.

The unit 20 also can be programmed to give visual prompting to a user by means of the interface with the television. The use of cartridges ensures "plug and play" simplicity, making operation and use of the unit 20 simple.

No additional wiring is necessary with the present unit. Additional RAM can provide additional "fast" storage for file storage.

The unit 10 can also receive JPEG files which are compressed still images. An additional cartridge can hold JPEG Fax software to generate means and allow color display on the TV using the internal video RAM. JPEG files reside in FAX/Modem memory, premises control unit memory, or on a disk. A modem can also transfer color images for displaying on the television or other display. Additionally, the unit 20 can be programmed to conduct banking, or other services, so that financial data can be downloaded to the unit 20.

The flow chart illustrates the various steps of just one aspect of the premises recording unit of the present invention.

For purposes of understanding, the blocks of the flow chart are numbered with numerals starting in the 200 series.

A call initially comes into the premises (Block 200). The ring detection circuit 84 detects the number of rings and transmits this information to the microprocessor 32 (Block 202). In response to the ring detection circuit, the microprocessor 32 generates instructions to other components so that the call is answered (Block 204). A menu is given asking for several prompts (Block 206). The caller can respond by a selected keypad sequence, such **T* or any other desired prompts (Block 208). The outside caller can retrieve messages if a certain password is entered based on instructed prompts. Selected messages recorded in memory then can be retrieved (Block 210).

In addition, the network caller can leave a message (Block 212). When the premises user returns, the premises phone can be used as a controller. Additionally, the premises control unit, a hand-held remote control can also be used.

The user initially picks up the receiver from the premises phone and waits for a dial tone (Block 214). If there is a dial tone, the user depresses a predetermined keypad sequence, which activates the switch so that the DTMF tones are carried along a subcarrier channel of the twisted pair wire (Block 216). Alternately, a regular call can be made (Block 218). The switch has corresponding translation software and hardware to ensure that frequency generation occurs for a subcarrier channel. The premises recording unit can then respond with prompts on message retrieval as before (Block 220).

It is to be understood that the above description is only one preferred embodiment of the invention. Numerous other arrangements may be devised by one skilled in the art without departing from the spirit or skilled of the invention.

That which is claimed is:

1. A system for recording and accessing information received over a phone network comprising:

at least one premises phone connected to a phone network via a first communication channel, premises recording means for recording information, phone messages and prompts received from said phone network along the first communication channel, said premises recording means including means for interfacing with a video display for displaying stored information, telephone messages and prompts, said premises recording means being responsive to signals received from a premises phone along a second communication channel extending between said premises phone and said premises recording means, and switch means operatively connected between said premises phone, phone network and premises recording means for switching said premises phone from communication with said phone network along said first communication channel and control of said premises recording means through signal generation by said premises phone through said second communication channel to said premises recording means wherein said switch means is responsive to a predetermined dual tone multifrequencies (DTMF) sequence received from said premises phone to switch said premises phone into communication with said premises recording means via said second communication channel.

2. The system according to claim 1 wherein said first communication channel comprises a twisted pair wire and a carrier signal extending along said twisted pair wire having a first frequency range, and said second communication channel comprises a subcarrier signal extending along said twisted pair wire having a second frequency range.

3. The system according to claim 1 wherein said first communication channel comprises a twisted wire pair and said second communication channel comprises a second twisted wire pair and a control signal extending along said second twisted wire pair.

4. The system according to claim 1 wherein said switch means is responsive to said DTMF sequence only when a dial tone is present.

5. The system according to claim 1 wherein said switch means is controlled by raising the premises phone from off its hook.

6. The system according to claim 1 wherein said premises recording means is responsive to DTMF tones generated from a network phone to retrieve and prompt audio messages from said premises recording means.

7. The system according to claim 1 include ring detection means operatively connected to said premises recording means and said switch means, wherein said switch means is responsive to a predetermined number of rings to switch the call to the premises recording means.

8. The system according to claim 1 wherein said switch means is responsive to an incoming call from a network phone to switch said call to said premises recording means, wherein said premises recording means is responsive to DTMF tones generated by said network phone to enable message retrieval from and audio prompting with said premises recording means.

9. The system according to claim 1 wherein said premises phone comprises a cordless phone unit.

10. The system according to claim 1 wherein said premises recording means includes voice recognition circuitry for responding to voice commands.

11. The system according to claim 1 wherein said premises recording means includes a microprocessor, memory means for storing digital information, and analog-to-digital converter means for recording a voice signal.

12. The system according to claim 1 wherein said premises recording means includes infrared sensing means for enabling control of said premises recording means via an infrared signal.

13. The system according to claim 12 including a keyboard having infrared signaling means for generating infrared signals corresponding to the depressed keys, and wherein said premises recording means includes means for receiving said infrared signals and for further processing and display of any characters on said video display.

14. The system according to claim 1 wherein said system includes a plurality of premises phones and a respective switches corresponding to a respective premises phone.

15. The system according to claim 1 including memory means for storing caller identification information related to an incoming telephone call having a caller identification code.

16. A system for recording and accessing information received over a phone network comprising:
at least one premises phone connected to a phone network via a first communication channel,
a premises recording unit including
a) a housing, and
b) premises recording means mounted within said housing for recording information, phone messages and prompts received from said phone network along said first communication channel, said premises recording means including means for interfacing with a video display for displaying stored information, telephone messages and prompts, said premises recording means being responsive to signals received from said premises phone along a second communication channel extending between said premises phone and said premises recording means, said premises recording means including a microprocessor, memory means for storing information received from said network, a local bus including an expansion bus, and a cartridge slot for receiving cartridges for interconnecting with said expansion bus for expanding functions of said premise recording means, and
switch means operatively connected between said premises phone, phone network and premises recording means for switching said premises phone from communication with said phone network along said first communication channel and control of said premises recording means through signal generation by said premises phone through said second communication channel to said premises recording unit.

17. The system according to claim 16 including a modem cartridge for insertion into said cartridge slot.

18. The system according to claim 16 including a modem operatively connected to the premises recording means.

19. The system according to claim 16 wherein said first communication channel comprises a twisted pair wire and a carrier signal extending along said twisted pair wire having a first frequency range, and said second communication channel comprises a subcarrier signal extending along said twisted pair wire having a second frequency range.

20. The system according to claim 16 wherein said switch means is responsive to a predetermined dual tone multifrequency tone (DTMF) sequence received from said premises phone to switch said premises phone to communication with said premises recording means via said second communication channel.

21. The system according to claim 20 wherein said switch means is responsive to said DTMF sequence only when a dial tone is present.

22. The system according to claim 16 wherein said premises recording means is responsive to DTMF tones generated from a network phone to enable said network phone to retrieve and prompt messages from said premises recording means.

23. The system according to claim 16 include ring detection means operatively connected to said premises recording means and said switch means, wherein said switch means is responsive to a predetermined number of rings to switch the call to the premises recording means.

24. The system according to claim 16 wherein said switch means is responsive to an incoming call from a network phone to switch said call to said premises recording means, wherein said premises recording means is responsive to DTMF tones generated by said network phone to enable message retrieval from and audio prompting with said premises recording means.

25. The system according to claim 16 wherein said premises phone comprises a cordless phone unit.

26. The system according to claim 16 wherein said premises recording means includes voice recognition circuitry for responding to voice commands.

27. The system according to claim 16 wherein said premises recording unit includes infrared sensing means for enabling control of said premises recording means via an infrared signal.

28. The system according to claim 27 including a keyboard having infrared signaling means for generating infrared signals corresponding to the depressed keys, and wherein said premises recording means includes means for receiving said infrared signals and for further processing and display of any characters on said video display.

29. The system according to claim 16 wherein said system includes a plurality of premises phones and a respective switches corresponding to a respective premises phone.

30. An apparatus for recording telephone message information received over an outside phone network and intended for a local premises comprising:

a housing, premises recording means mounted within said housing for recording phone messages received from said outside network along a first communication channel, said premises recording means including means for interfacing with a video display for displaying information, telephone messages and prompts, said premises recording means being responsive to signals received from a premises phone along a second communication channel extending between said premises phone and said premises recording means, said premises recording means including a microprocessor, memory means for storing digital information, a local bus including an expansion bus, and a cartridge slot for receiving cartridges for interconnection with said expansion bus for expanding functionality of said premise recording means.

31. The apparatus according to claim 30 including a modem cartridge for insertion into said cartridge slot.

32. The apparatus according to claim 30 including a modem operatively connected to said premises recording means for receiving incoming information along said first communication channel.

33. The apparatus according to claim 30 including memory means for storing caller identification information related to an incoming telephone call having a caller identification code.

34. The apparatus according to claim 30 wherein said premises recording means is responsive to generated DTMF tones to enable retrieval and prompting of messages from said premises recording means.

35. The apparatus according to claim 30 wherein said premises recording means is responsive to a predetermined dual tone multifrequency tone (DTMF) sequence received along a first communication channel.

36. The apparatus according to claim 30 including a video display mounted to the housing for displaying any stored information, messages and prompts.

37. The apparatus according to claim 30 wherein said premises recording means includes voice recognition circuitry for responding to voice commands.

38. The apparatus according to claim 30 including means for receiving fax messages, said premises recording means including means for recording said fax messages for future display on a video display.

39. The apparatus according to claim 30 including means for interfacing with a cable setup box operatively connected to the cable communication channel and the premises recording means, wherein the premises recording means includes control means for routing information to the video display.

40. The apparatus according to claim 30 including means for connecting a premises phone to the premises recording means.

41. A system for recording and accessing information received over a phone network comprising:

a premises phone connected to a phone network via a first communication channel, premises recording means for storing information received from said network over the first communication channel, said premises recording means including means for interfacing with a video display for displaying stored information, said premises recording means being responsive to signals received from said premises phone over a second communication channel extending between said premises phone and said premises recording means, and switch means operatively connected to said premises phone, said network and said premises recording means for switching said premises phone from communication with said network over said first communication channel to control of said premises recording means using signals generated by said premises phone and sent over said second communication channel to said premises recording means wherein said switch means is responsive to a predetermined dual tone multifrequency tone (DTMF) sequence received from said premises phone to switch said premises phone into communication with said premises recording means via said second communication channel.

42. The system according to claim 42 including a twisted wire pair on which said first and second communication channels extend, and wherein said first communication channel comprises a carrier signal on said twisted pair wire and said second communication channel comprises a sub-carrier signal on said twisted wire pair.

* * * * *